(12) United States Patent  
Yagasaki et al.

(10) Patent No.: US 7,867,121 B2
(45) Date of Patent: Jan. 11, 2011

(54) METAL V-BELT

(75) Inventors: Toru Yagasaki, Wako (JP); Hideaki Aoyama, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 12/252,977

(22) Filed: Oct. 16, 2008

(65) Prior Publication Data

US 2009/0111633 A1  Apr. 30, 2009

(30) Foreign Application Priority Data

Oct. 25, 2007 (JP) .............................. 2007-278179

(51) Int. Cl.
*F16G 5/00* (2006.01)
*F16G 5/16* (2006.01)

(52) U.S. Cl. .................. 474/242; 474/201; 474/240
(58) Field of Classification Search .............. 474/201, 474/240, 242

See application file for complete search history.

(56) References Cited

U.S. PATENT DOCUMENTS

| | | | |
|---|---|---|---|
| 6,342,020 B1 * | 1/2002 | Aoyama | 474/242 |
| 6,440,023 B2 * | 8/2002 | Kanehara et al. | 474/242 |
| 6,755,760 B2 * | 6/2004 | Akagi et al. | 474/242 |

FOREIGN PATENT DOCUMENTS

| | | |
|---|---|---|
| EP | 0 626 526 A | 11/1994 |
| EP | 1 013 964 A | 6/2000 |
| EP | 1 018 608 A | 7/2000 |
| EP | 1 172 582 A | 1/2002 |
| EP | 1 231 407 A | 8/2002 |
| JP | 2000-193041 A | 7/2000 |
| JP | 2001-200894 A | 7/2001 |
| JP | 3605570 B2 | 10/2004 |
| JP | 3755833 B2 | 1/2006 |

* cited by examiner

*Primary Examiner*—Robert A Siconolfi
*Assistant Examiner*—Vu Q Nguyen
(74) *Attorney, Agent, or Firm*—Arent Fox LLP (57) ABSTRACT

A metal V-belt includes a plurality of metal elements supported by a metal ring. The metal ring includes front and rear main surfaces, a pair of left and right slots that receive the metal ring therein, the slots being defined between a saddle surface and an ear-part bottom surface. A protrusion is provided on one of the front and rear main surfaces, and a concavity is provided in the other of the front and rear main surfaces. A clearance defined between an outermost peripheral surface of the metal ring and the ear-part bottom surface of the metal element is set to a value that at an exit of a driven pulley, contact of the innermost peripheral surface of the metal ring with the saddle surface of the metal element, and contact of the protrusion of a succeeding metal element and the concavity of a preceding metal element is avoided.

2 Claims, 12 Drawing Sheets

METAL V-BELT

BACKGROUND OF THE INVENTION

1. Field of the Invention

The present invention relates to a metal V-belt including a metal ring having an endless belt shape and a plurality of metal elements supported by the metal ring in the longitudinal direction of the metal ring. More particularly, the present invention relates to a metal V-belt wherein contact of an innermost periphery of the metal ring with a saddle surface of a metal element, and contact of a protrusion and corresponding concavity of neighboring metal rings is avoided when exiting a driven pulley.

2. Description of the Related Art

Japanese Patent No. 3755833 discloses a driving belt wherein a concavity for receiving a carrier (a metal belt) is provided in a transverse-direction member (a metal element) having a supporting surface and a top portion surface. A point at which the transverse-direction member, while in an inclined state, contacts a supporting surface is called a first contact point and a point at which the transverse-direction member, again while in an inclined state, contacts the top portion surface is called a second contact point, by specifying $0.2<\tan^-(B/A)<0.8$, where A is the distance between the first and second contact points along the axial direction of a driving belt (a metal V-belt) in a position where the transverse-direction member is straight, and B is the distance between the carrier and the second contact point along the radial direction of the driving belt in a position where the transverse-direction member is straight. The disclosed driving belt improves engagement into a drive pulley and a driven pulley by preventing the inclination of a large number of transverse-direction members supported by the carrier.

In the driving belt disclosed by JP '833, the transverse-direction member has sufficient play for positioning itself with respect to the carrier and the pulleys, and the inclination of the transverse-direction member is prevented in order to ensure a good wedge action in the pulleys. However, a play is necessary for inclination between a protrusion and a concavity that engage each other and the play moves the transverse-direction member laterally, with the result that the transverse-direction member and pulleys are apt to come into contact with each other during entry into the pulleys, making it necessary to increase the strength of the transverse-direction member. In addition, because rolling of the transverse-direction member is controlled by the abutment of an outer peripheral surface of the carrier against a top-portion surface (an ear-part bottom surface) of the transverse-direction member, this poses the problem that a specific position of the outer periphery of the carrier that abuts strongly against the top-portion surface is damaged by fatigue, reducing the durability of the whole metal belt.

Japanese Patent No. 3605570 discloses a metal V-belt in which a maximum rolling angle of one metal element relative to upstream-side metal elements is controlled by the engagement between a protrusion and a concavity, wherein the rolling of metal elements is controlled without the metal ring abutting against the metal elements.

The metal V-belt disclosed by JP '570 is intended to solve the problem in the technique disclosed in JP '833. To achieve the intended goal, although rolling of metal elements is controlled without the abutment of a metal ring against the metal elements, a maximum rolling angle of one metal element relative to upstream-side metal elements is controlled by the engagement between a protrusion and a concavity, which requires increasing the strength of the engaging portion.

Japanese Patent Application Laid-open No. 2000-193041 discloses known a metal V-belt having an improved or increased durability that is achieved by setting a clearance between a side surface of a slot of a metal element and a metal ring at a value larger than a clearance in the belt thickness direction between a protrusion and a concavity of the metal element, which prevents the generation of a compressive stress that pinches and bends the metal ring.

In the metal V-belt disclosed by JP '041, the durability of the metal ring is increased by preventing generation of the compressive stress that pinches and bends the metal ring. However, in order to increase the durability of the whole metal belt, it is required to further increase reliability in strength by improving the strength of the metal elements in addition to the strength of the metal ring.

SUMMARY OF THE INVENTION

The present invention has been made in view of such circumstances and has as an aspect a metal V-belt in which the durability of the entire metal V-belt is improved without having to increase the strength of the protrusion and concavity of the metal element.

In order to achieve the aspect, according to a first feature of the present invention, there is provided a metal V-belt including a metal ring having an endless belt shape; and a plurality of metal elements supported by the metal ring in the longitudinal direction of the metal ring. The metal V-belt is wound on a drive pulley and a driven pulley and transmits power between the drive pulley and the driven pulley. The metal element includes front and rear main surfaces; a pair of right and left slots that receive the metal ring between a saddle surface and an ear-part bottom surface connecting the front and rear main surfaces; a protrusion provided in a protruding manner on one of the front and rear main surfaces; and a concavity provided in a depressed manner in the other of the front and rear main surfaces so as to engage the protrusion of a neighboring metal element. A clearance is defined between an outermost peripheral surface of the metal ring and the ear-part bottom surface of the metal element, wherein at an exit of the driven pulley where top portions of the front and rear main surfaces of the metal elements that are adjacent to each other in the longitudinal direction of the metal ring contact each other, and the outermost peripheral surface of the metal ring contacts the ear-part bottom surface of the metal element, contact between the innermost peripheral surface of the metal ring and the saddle surface of the metal element, and contact between the protrusion and concavity of neighboring metal elements is avoided.

According to a second feature of the present invention, in addition to the first feature, the clearance $\underline{d}$ defined by the outermost peripheral surface of the metal ring and the ear-part bottom surface of the metal element is set relationship dmin< $\underline{d}$<dmax, and wherein a standard deviation is denoted by σ, dmin and dmax are respectively defined as: dmin={(minimum distance between saddle surface and ear-part bottom surface)−3σ−(layer thickness of metal ring)}, and dmax={ (minimum distance between saddle surface and ear-part bottom surface)+3σ−(layer thickness of metal ring)}.

With the above features, it is unnecessary to set or otherwise establish a play for inclination of the metal element between the protrusion and the concavity of the metal element at the exit of the driven pulley. The metal element only inclines with the engaging portion of the protrusion and the concavity serving as the center and does not move laterally. Therefore, when entering the drive pulley, the concavity or protrusion of a succeeding or neighboring metal element engages the protrusion or concavity of a preceding metal element that has entered the drive pulley first, and the succeeding metal element smoothly enters the drive pulley while avoiding contacting the drive pulley. Thus, it is possible to improve the durability of the whole metal V-belt without having to increase the strength of the protrusion and concavity of the metal element.

If the clearance between the outermost peripheral surface of the metal ring and the ear-part bottom surface of the metal element is set to have too small of a value, at an exit of a driven pulley where top portions of the front main surface and rear main surface of the metal elements that are adjacent to each other in the longitudinal direction of the metal ring come into contact with each other, and where the outermost peripheral surface of the metal ring comes into contact with the ear-part bottom surface of the metal element, the innermost peripheral surface of the metal ring first contacts the saddle surface of the metal element and prevents the relative slip of the metal ring and the metal element, with the result that the service life of the metal ring and the metal element is shortened.

If the clearance between the outermost peripheral surface of the metal ring and the ear-part bottom surface of the metal element is set to have too large of a value, at an exit of a driven pulley where top portions of the front main surface and rear main surface of the metal elements that are adjacent to each other in the longitudinal direction of the metal ring come into contact with each other, and where the outermost peripheral surface of the metal ring contacts the ear-part bottom surface of the metal element, the protrusion and the concavity contact each other with the result of the contact portion becoming worn.

DESCRIPTION OF THE PREFERRED EMBODIMENT

An embodiment of the present invention will be described below with reference to FIGS. 1 to 12. The definitions of the forward, backward, rightward, and leftward directions of a metal element used in this embodiment are shown in FIG. 2.

Figure 1:
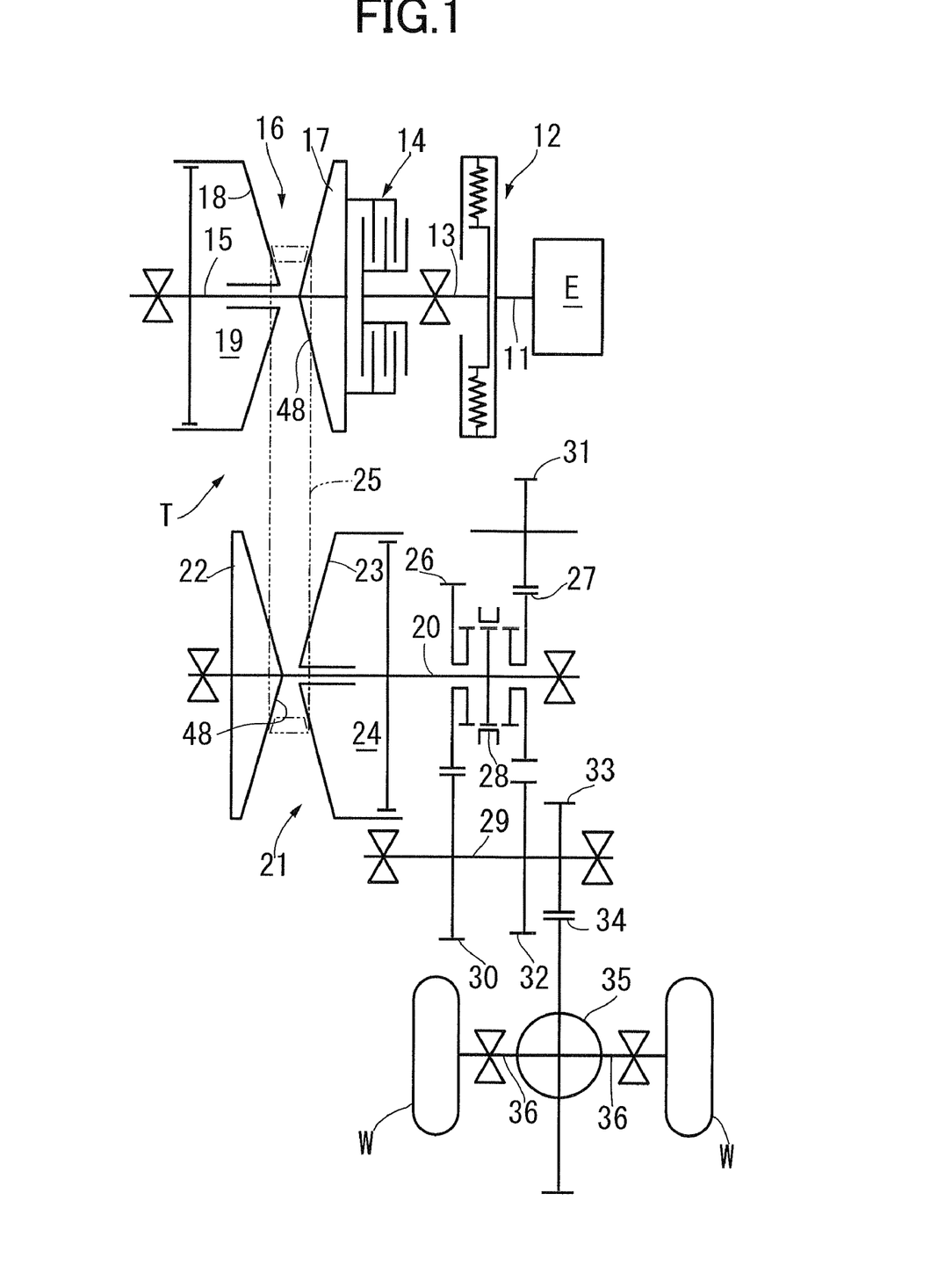
FIG. 1 is a schematic diagram of a power transmission system of a vehicle.
Figure 2:
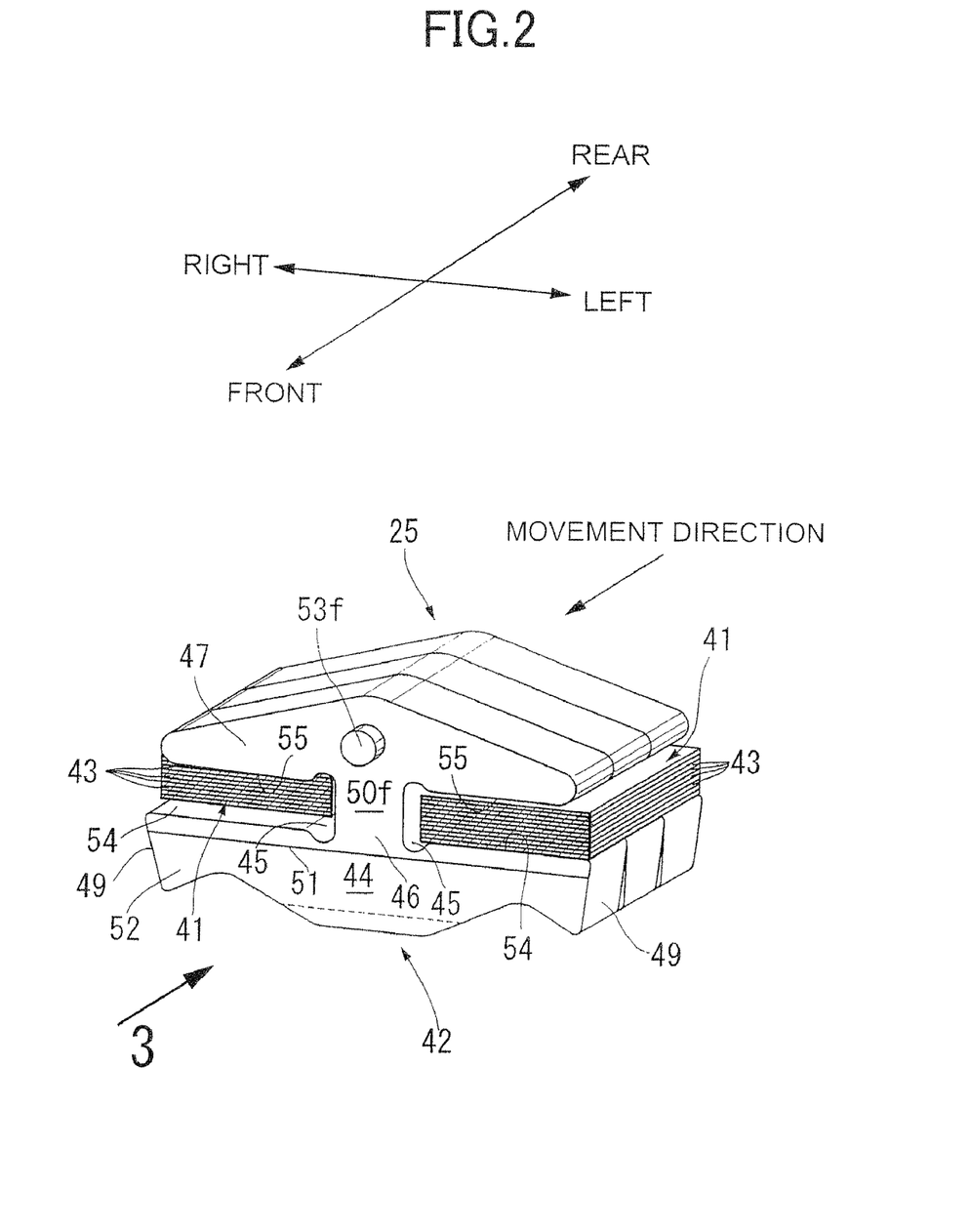
FIG. 2 is a partial perspective view of a metal V-belt according to a preferred embodiment of the present invention.

Referring to FIG. 1, an input shaft 13 connected to a crankshaft 11 of an engine E via a damper 12 is connected to a drive shaft 15 of a metal belt type continuously variable transmission T by a starting clutch 14. The drive shaft 15 is provided with a drive pulley 16, a driven shaft 20 disposed parallel to the drive shaft 15 is provided with a driven pulley 21, and a metal V-belt 25 according to a preferred embodiment of the present invention is wound on the drive pulley 16 and the driven pulley 21.

The drive pulley 16 is provided with a fixed-side pulley half body 17 fixed to the drive shaft 15 and a movable-side pulley half body 18 capable of moving toward and away from the fixed-side pulley half body 17, and the movable-side pulley half body 18 is urged toward the fixed-side pulley half body 17 under hydraulic pressure acting on an oil chamber 19. The driven pulley 21 is provided with a fixed-side pulley half body 22 fixed to the driven shaft 20 and a movable-side pulley half body 23 capable of moving toward and away from the fixed-side pulley half body 22, and the movable-side pulley half body 23 is urged toward the fixed-side pulley half body 22 under hydraulic pressure acting on an oil chamber 24.

A forward-movement drive gear 26 and a reverse-movement drive gear 27 are supported by the driven shaft 20 to be relatively rotatable, and the forward-movement drive gear 26 and the reverse-movement drive gear 27 can be selectively coupled to the driven shaft 20 by a selector 28. A forward-movement driven gear 30 meshing with the forward-movement drive gear 26 and a reverse-movement driven gear 32 meshing with the reverse-movement drive gear 27 are fixed to an output shaft 29 disposed parallel to the driven shaft 20 via a reverse-movement idle gear 31.

The rotation of the output shaft 29 is input to a differential gear 35 via a final drive gear 33 and a final driven gear 34 and transmitted from the differential gear 35 to driving wheels W, W via left and right axles 36, 36.

The driving force of the engine E is transmitted to the driven shaft 20 via the crankshaft 11, the damper 12, the input shaft 13, the starting clutch 14, the drive shaft 15, the drive pulley 16, the metal V-belt 25, and the driven pulley 21. When a forward-movement direction has been selected, the driving force of the driven shaft 20 is transmitted to the output shaft 29 via the forward-movement drive gear 26 and the forward-movement driven gear 30, which causes the vehicle to be driven in a forward direction. When a reverse-movement direction has been selected, the driving force of the driven shaft 20 is transmitted to the output shaft 29 via the reverse-movement drive gear 27, the reverse-movement idle gear 31, and the reverse-movement driven gear 32, which causes the vehicle to be driven in a backward or reverse direction.

By controlling the hydraulic pressure acting on the oil chamber 19 of the drive pulley 16 and the oil pressure acting on the oil chamber 24 of the driven pulley 21, the transmission gear ratio is adjusted in a stepless manner. That is, if the hydraulic pressure acting on the oil chamber 24 of the driven pulley 21 is increased relative to the hydraulic pressure acting on the oil chamber 19 of the drive pulley 16, then the groove width of the driven pulley 21 decreases and the effective radius increases, as a result of which, the groove width of the drive pulley 16 increases and the effective radius decreases. Therefore, the transmission gear ratio of the transmission T changes in a stepless manner toward LOW. Conversely, if the hydraulic pressure acting on the oil chamber 19 of the drive pulley 16 is increased relative to the hydraulic pressure acting on the oil chamber 24 of the driven pulley 21, then the groove width of the drive pulley 16 decreases and the effective radius increases, as a result of which the groove width of the driven pulley 21 increases and the effective radius decreases. Therefore, the transmission gear ratio of the transmission T changes in a stepless manner toward OD.

Figure 3:
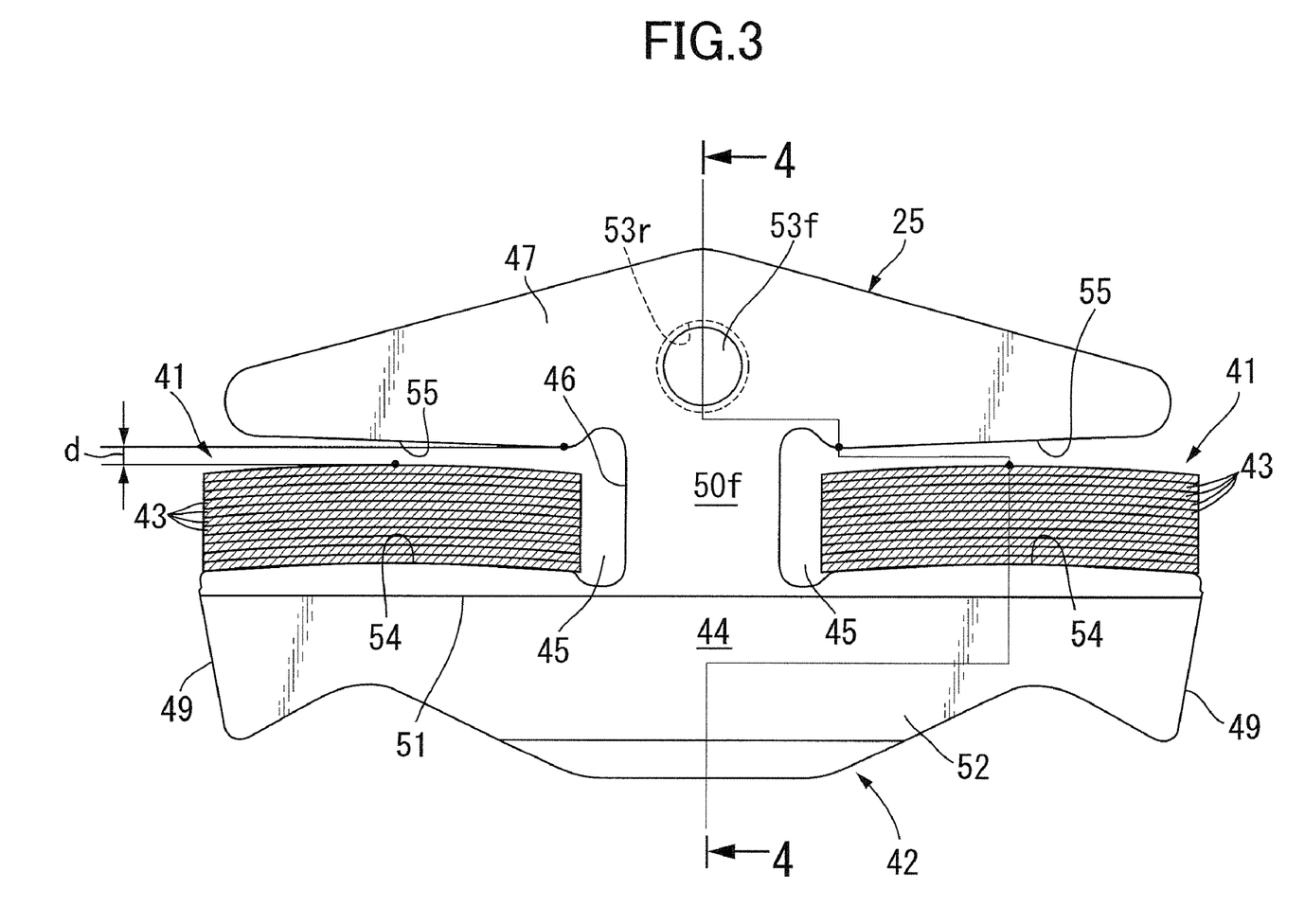
FIG. 3 is a diagram viewed in the direction of arrow 3 in FIG. 2.
Figure 4:
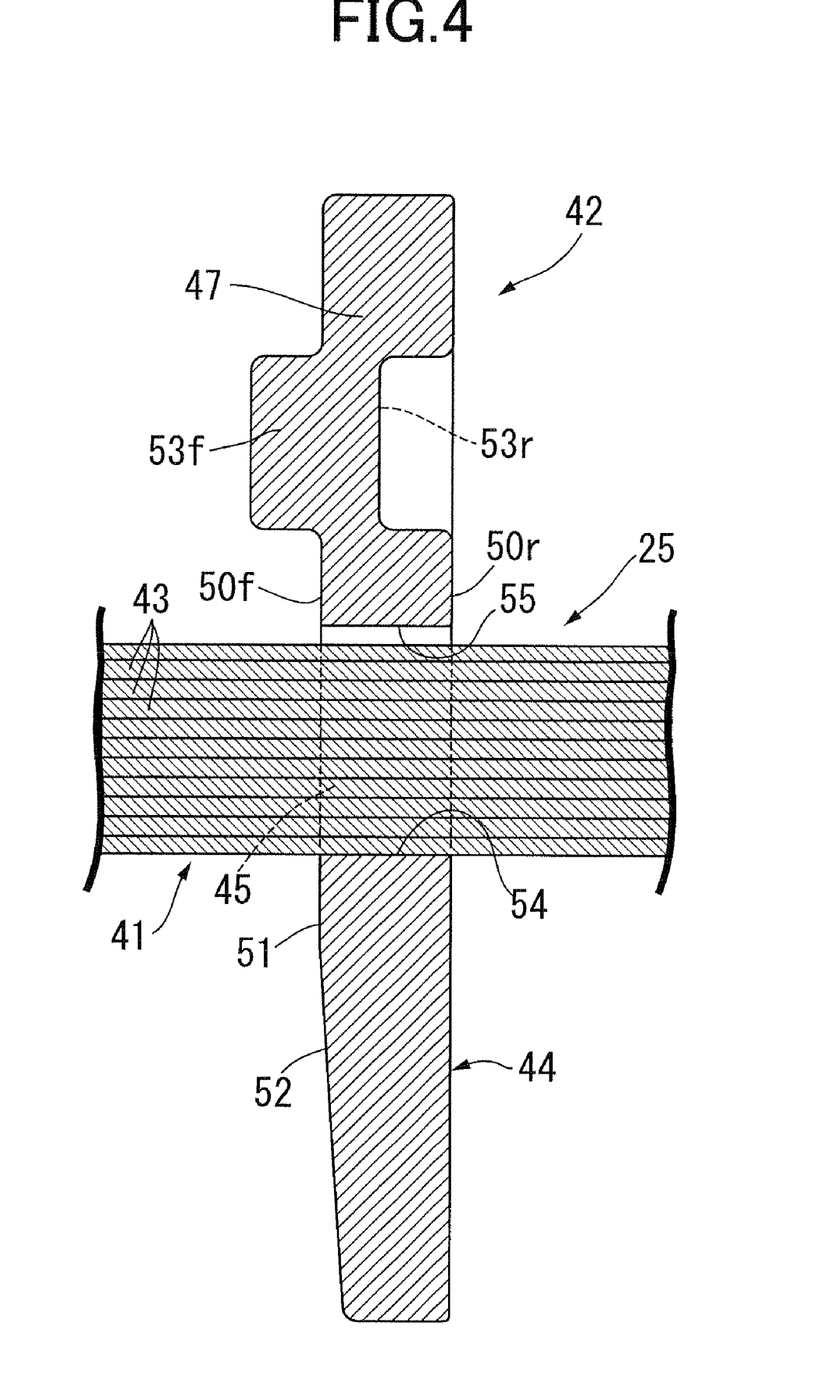
FIG. 4 is a sectional view taken along line 4-4 in FIG. 3.

In FIGS. 2 to 4, the metal V-belt 25 includes a pair of left and right belt-shape metal rings 41, 41, and a plurality of metal elements 42 supported by the metal rings 41, 41. Each of the metal rings 41 includes a plurality of laminated belt-shaped ring plates 43.

The metal element 42 is formed by blanking a metal plate material, and has an element main part 44 with a substantially trapezoidal shape, a neck part 46 located between a pair of right and left slots 45, 45 that receive the metal rings 41, 41 therein, and an ear part 47 having a substantially triangular shape, which is connected to an upper part of the element main part 44 via the neck part 46. A pair of pulley abutment surfaces 49, 49 that abut against V-grooves 48, 48 of the drive pulley 16 and driven pulley 21 (see FIG. 1) are formed in both end portions of the element main part 44 in the leftward and rightward directions. On the front and rear sides of the movement direction of the metal element 42, a front main surface 50$f$ and a rear main surface 50$r$, that are orthogonal relative to the movement direction of the metal element 42 and parallel to each other, are formed. The front main surface 50$f$ of the succeeding metal element 42 in the movement direction abuts against the preceding rear main surface 50$r$ of the preceding metal element 42 in the movement direction. In a lower portion of the front main surface 50$f$, an inclined surface 52 is formed via a locking edge 51 that extends in the leftward and rightward directions.

To connect adjacent metal elements 42, 42 to each other in a front-and-rear relation, a circular protrusion 53$f$ is provided in a protruding manner on either a front surface of the ear part 47 (the front main surface 50$f$) or a rear surface thereof (the rear main surface 50$r$). In the illustrated embodiment, the protrusion 53$f$ is provided on the front surface of the ear part 47 (the front main surface 50$f$). A correspondingly shaped or circular concavity 53$r$ is defined in the other of the front main surface and the rear main surface of the ear part 47 (the rear main surface 50$r$).

Incidentally, opposite side surfaces of the slot 45 include a saddle surface 54 and an ear-part bottom surface 55 that connect the front main surface 50$f$ and the rear main surface 50$r$. The metal rings 41, 41 are received by the slots 45, 45 defined between the saddle surfaces 54, 54 and the ear-part bottom surfaces 55, 55. Inner peripheral surfaces of the metal rings 41, 41 abut against the saddle surfaces 54, 54, and outer peripheral surfaces of the metal rings 41, 41 abut against the ear-part bottom surfaces 55, 55. In addition, the ear-part bottom surface 55 is formed to be inclined such that the ear-part bottom surface 55 is spaced farther from the saddle surface 54 than the ear-part bottom surface 55 is spaced from the neck part 46. Also, the saddle surface 54 is formed to be slightly arched and bulged toward the ear-part bottom surface 55 side.

Figure 5:
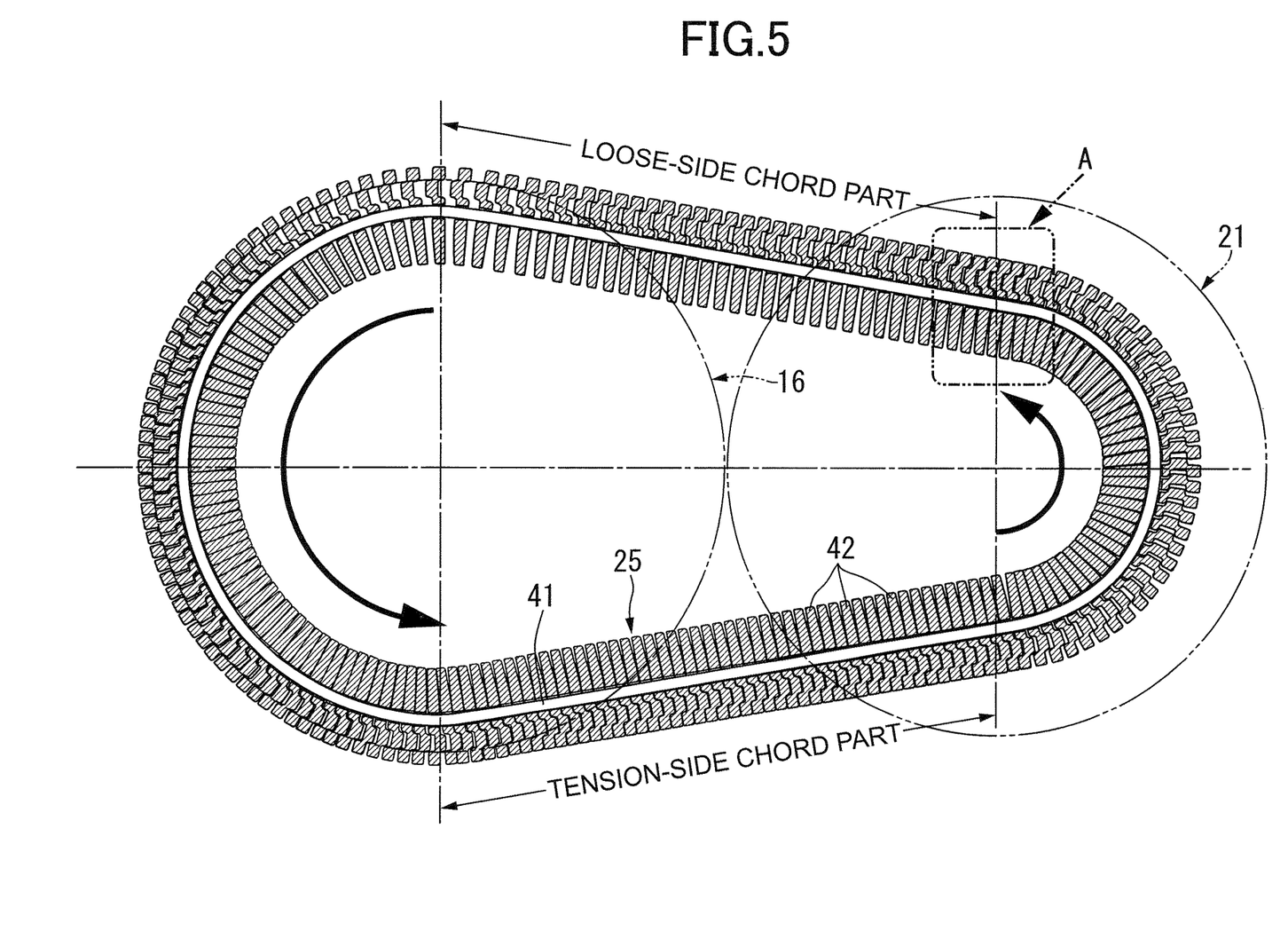
FIG. 5 is a side view of a metal V-belt wound on a drive pulley and a driven pulley.

In FIG. 5, the metal V-belt 25 wound on the drive pulley 16 and the driven pulley 21 is such that according to the rotation of the drive pulley 16 indicated by the arrows, in a chord part moving from the drive pulley 16 toward the driven pulley 21, i.e., a tension-side chord part that performs the transmission of the driving force, adjacent metal elements 42 abut against each other and cause a pressing force to act on each other. In contrast to this, in a chord part moving from the driven pulley 21 toward the drive pulley 16, i.e., a loose-side chord part that does not perform the transmission of the driving force, adjacent metal elements 42 do not cause a pressing force to act on each other and, therefore, the posture of the metal elements 42 does not become stable compared to the tension-side chord part.

Figure 6:
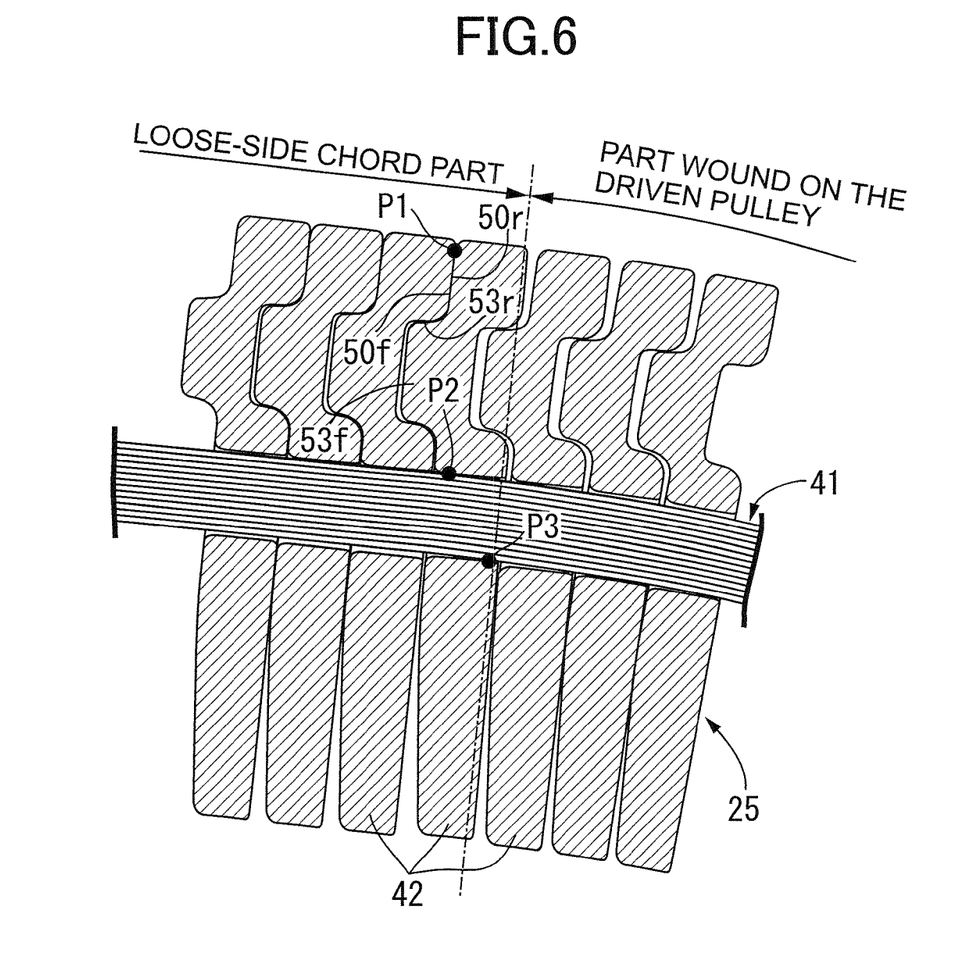
FIG. 6 is an enlarged view of a portion of the metal ring indicated by the arrow A in FIG. 5 when the clearance between the outermost periphery and the bottom surface of the ear part of the metal ring is small.
Figure 7:
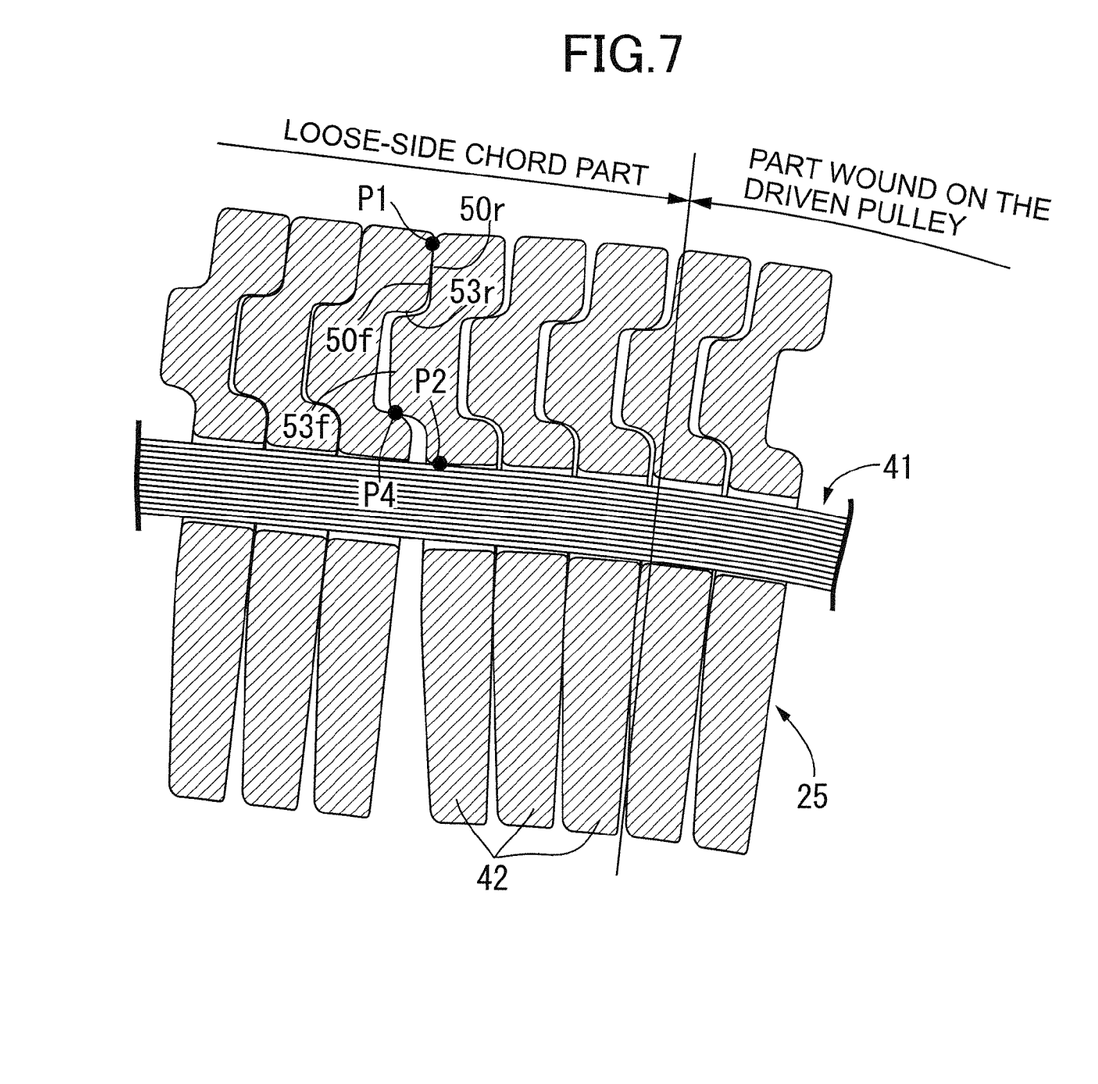
FIG. 7 is an enlarged view of a portion of a metal ring indicated by the arrow A in FIG. 5 when the clearance between the outermost periphery and the bottom surface of the ear part of the metal ring is large.
Figure 8:
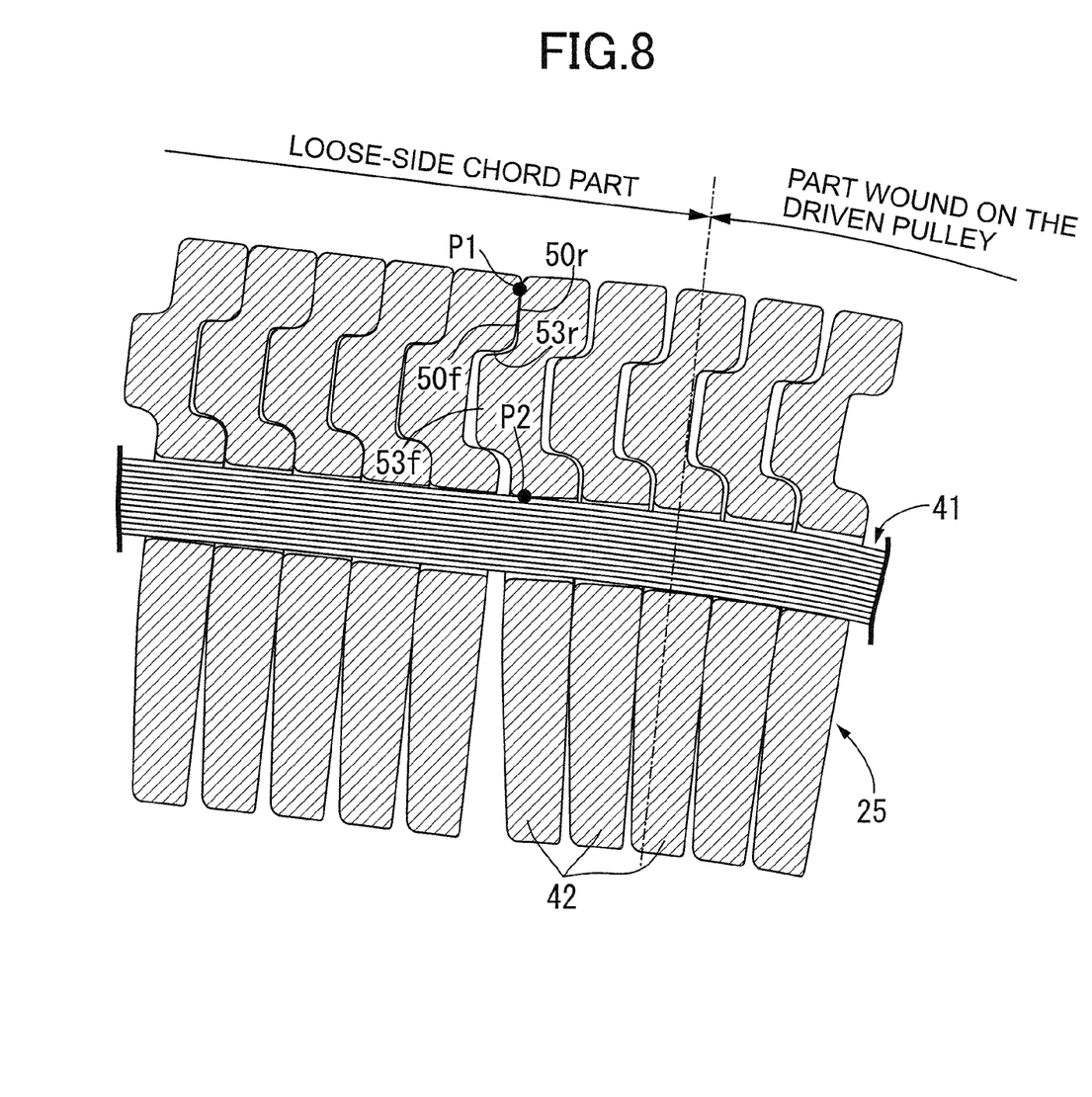
FIG. 8 is an enlarged view of a portion indicated the arrow A in FIG. 5 when the clearance between the outermost periphery and the bottom surface of the ear part of the metal ring is an appropriate value.

That is, the metal elements 42 that have performed power transmission from the drive pulley 16 to the driven pulley 21 in a dense condition without a gap therebetween move out, at the exit of the driven pulley 21, to the loose-side chord part while keeping the posture within the driven pulley 21, and in the loose-side chord part, gaps are generated between the metal elements 42. On this occasion, even in the loose-side chord part, the metal ring 41 is in a linearly tensed condition due to the tension between the driven pulley 21 and the drive pulley 16. From results of a numerical analysis, as shown in FIGS. 6 to 8, it is apparent that the posture of the metal element 42 at the exit of the driven pulley 21 is in a forward inclined condition due to the difference in the behavior of the metal elements 42 and the metal ring 41, which causes the ear-part bottom surfaces 55 of the metal element 42 to come close to the outermost periphery of the metal ring 41.

Figure 9:
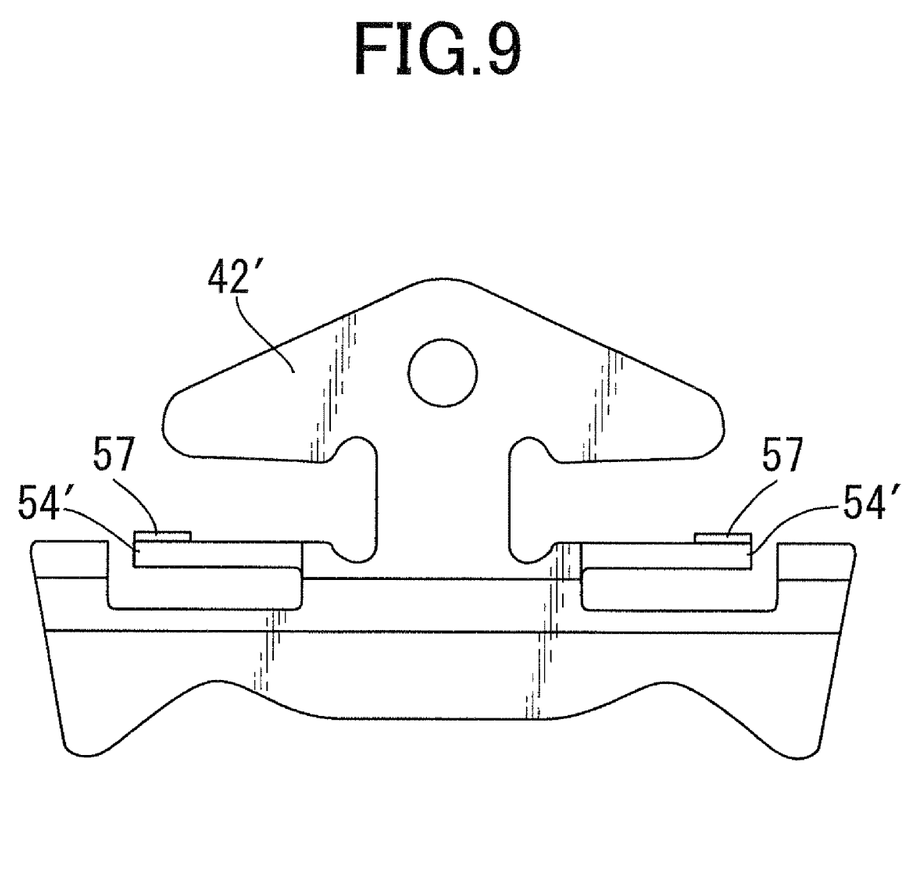
FIG. 9 is a front view of a test piece for measuring the contact reaction force between the rear end of the saddle surface and the metal ring.

To make sure of the posture of the metal element 42 at the exit of the driven pulley 21, the contact reaction force between the rear ends of the saddle surfaces 54 in the metal element 42 and the metal ring 41 was measured by using a test piece 42', as shown in FIG. 9. The test piece 42' has a shape wherein a partial surface of the rear ends of the saddle surfaces 54 in the metal element 42 are left as sensing parts 57 and the remaining surface of the saddle surface 54 is ground to a depth at which the remaining surface ceases to come into contact with the metal ring 41. In order to increase the sensitivity of measurement of contact reaction force of the sensing parts 57, in a lower portion of the sensing part 57, part of the portion corresponding to the element main part 44 is worked as a sensing lever 54' and a sensor is attached to the sensing levers 54'.

According to the test piece 42', it is strongly estimated that the output from the sensing parts 57 is weak when the test piece 42' is sandwiched between preceding and succeeding metal elements 42 in a vertical posture with respect to the metal ring 41, whereas strong signals are output from the sensing parts 57 when the test piece 42' has assumed a forward inclined posture.

Figure 10:
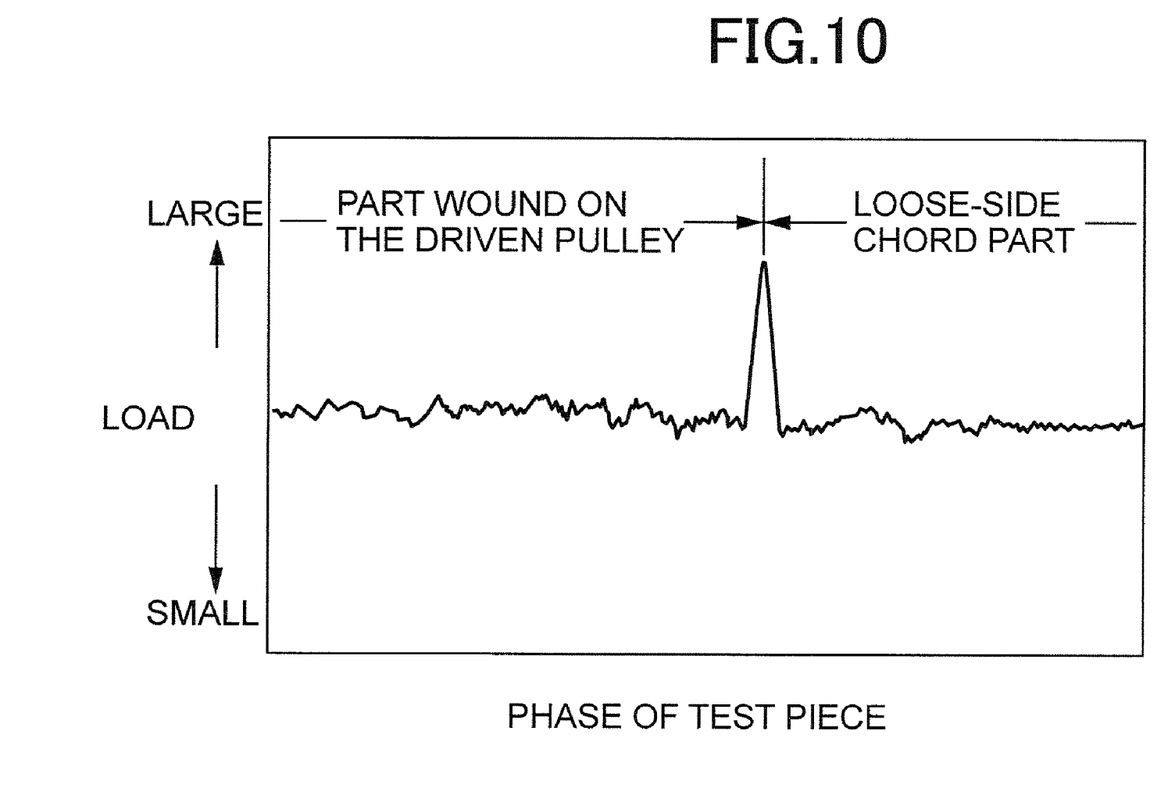
FIG. 10 is a diagram showing measurement results of the contact reaction force between the rear end of the saddle surface and the metal ring.

The measurement results are shown in FIG. 10. A signal of strong waveform is output when the test piece 42' makes a shift from the part wound on the driven pulley 21 to the loose-side chord part, that is, at the exit of the driven pulley 21. This shows that at the exit of the driven pulley 21, the metal element 42 moves out in a forward inclined posture from the driven pulley 21 to the loose-side chord part. That is, this backs up the forward inclined posture of the metal element 42 at the exit of the driven pulley 21 estimated in the above-described numerical analysis.

Because the metal element 42 moves out from the driven pulley 21 in a forward inclined posture, as shown in FIGS. 6 to 8, at the exit of the driven pulley 21, the top portions of the front main surface 50$f$ and rear main surface 50$r$ of adjacent metal elements 42, 42 in the longitudinal direction of the metal ring 41 contact each other at a contact point P1 and the outermost periphery of the metal ring 41 comes into contact with the ear-part bottom surface 55 at a contact point P2.

An investigation is made into the posture of the metal element 42 at the exit of the driven pulley 21 that is assumed when a change is made in a clearance d defined between the metal ring 41 and the metal element 42 within the slots 45, i.e., the clearance d between the outermost peripheral surface of the metal ring 41 and the ear-part bottom surfaces 55 that occurs when, as shown in FIG. 3, the innermost periphery of the metal ring 41 abuts against the saddle surfaces 54. When the clearance d is small, as shown in FIG. 6, at the exit of the driven pulley 21, the innermost periphery of the metal ring 41 first contacts the saddle surfaces 54 of the metal element 42.

That is, it follows that when the clearance d is set at a relatively small value, at the exit of the driven pulley 21, the innermost periphery of the metal ring 41 first contacts the saddle surfaces 54 of the metal element 42 at the contact point P3. Thereafter, the top portions of the front main surface 50f and rear main surface 50r of the metal elements 42, 42 that are adjacent to each other in the longitudinal direction of the metal ring 41 contact each other at the contact point P1, and at the same time, the outermost peripheral surface of the metal ring 41 contacts the ear-part bottom surface 55 at the contact point P2. When the innermost peripheral surface of the metal ring 41 first contacts the saddle surfaces 54 of the metal element 42 as described above, the relative slip between the metal ring 41 and the metal elements 42 is prevented, with the result that there is a possibility that the service life of the metal ring 41 and the metal elements 42 is shortened.

Also, it follows that when the clearance d is set at a relatively large value, as shown in FIG. 7, at the exit of the driven pulley 21, in the metal elements 42, 42 that are adjacent to each other, the protrusion 53f of a succeeding metal element 42 first contacts the concavity 53r of a preceding metal element 42 at a contact point P4, thereafter, the top portions of the front main surface 50f and rear main surface 50r of the metal elements 42, 42 that are adjacent to each other in the longitudinal direction of the metal ring 41 contact each other at the contact point P1, and at the same time, the outermost peripheral surface of the metal ring 41 contacts the ear-part bottom surface 55 at the contact point P2. When the top portions of the front main surface 50f and rear main surface 50r of the metal elements 42, 42 first contact each other as described above, the contact portion of the protrusion 53f and the concavity 53r is apt to be worn out or down.

Therefore, it follows that when the clearance d is set at an intermediate value, as shown in FIG. 8, at the exit of the driven pulley 21, the metal ring 41 does not come into contact with the saddle surfaces 54 of the metal element 42 and that in the metal elements 42, 42 that are adjacent to each other in the longitudinal direction of the metal ring 41, the protrusion 53f of the succeeding metal element 42 does not come into contact with the concavity 53r of the preceding metal element 42. Moreover, the top portions of the front main surface 50f and rear main surface 50r of the metal elements 42, 42 that are adjacent to each other come into contact with each other at the contact point P1 and, at the same time, the outermost periphery of the metal ring 41 comes into contact with the ear-part bottom surface 55 at the contact point P2.

Figure 11:
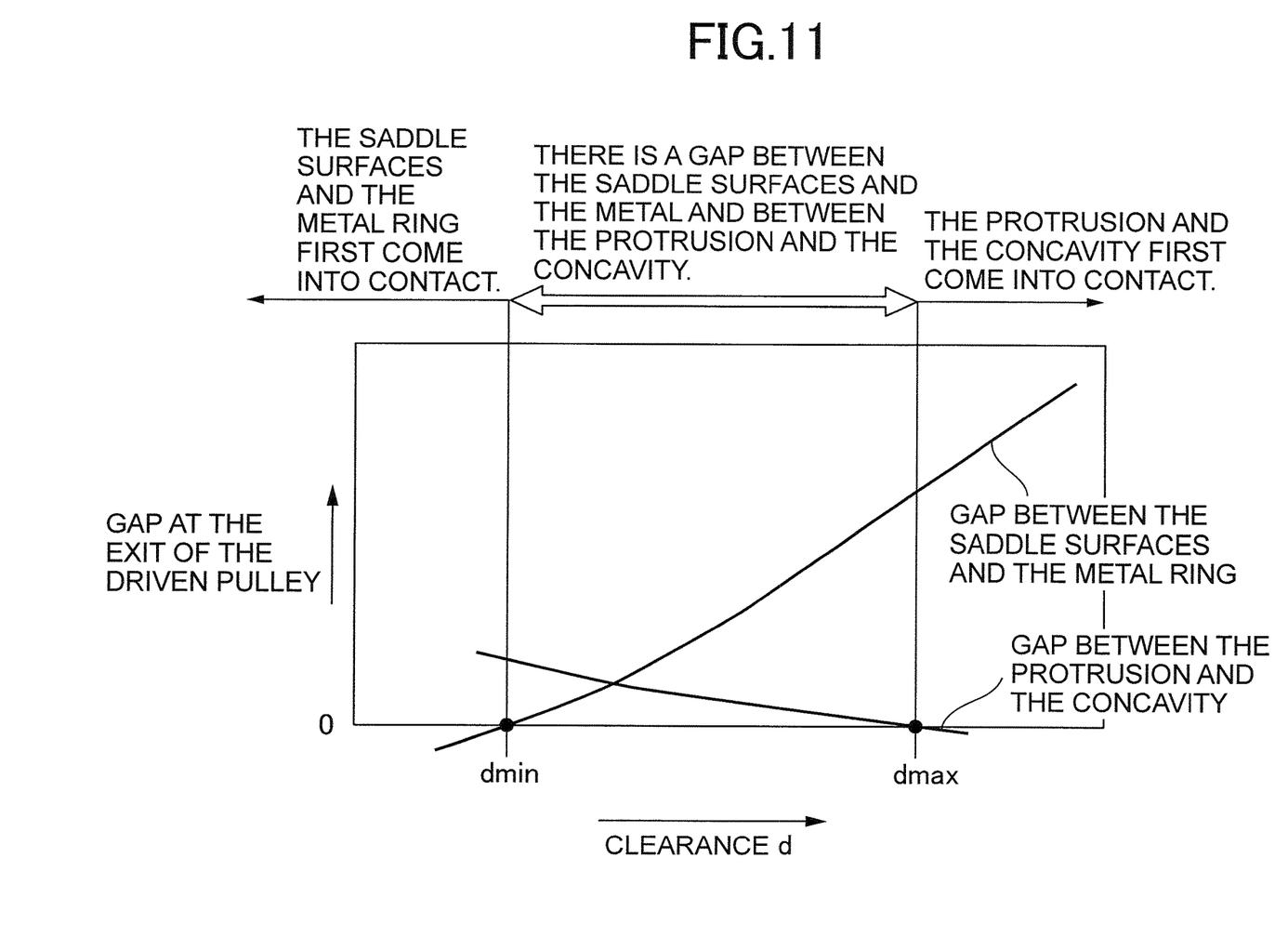
FIG. 11 is a diagram showing changes in the gap between metal elements and the gap between the metal ring and the metal element at the outlet of the driven pulley when the clearance between the outermost periphery and the bottom surface of the ear part of the metal ring is changed.

That is, as shown in FIG. 11, when the clearance d is decreased, at the exit of the driven pulley 21, the gap between the saddle surfaces 54 of the metal element 42 and the innermost peripheral surface of the metal ring 41 decreases, and when the clearance d is increased, at the exit of the driven pulley 21, the gap between the protrusion 53f and the concavity 53r of the metal elements 42, 42 decreases. If the clearance d that occurs when the gap between the saddle surfaces 54 of the metal element 42 and the innermost periphery of the metal ring 41 is "0," that is, when the innermost peripheral surface of the metal ring 41 first comes into contact with the saddle surface 54, and is denoted by dmin, and if the clearance d that occurs when the gap between the protrusion 53f and the concavity 53r is "0," that is, when the protrusion 53f and the concavity 53r first come into contact, and is denoted by dmax, then according to the present invention, the clearance d is set to satisfy the relationship where dmin<d<dmax holds.

By setting the clearance d accordingly, at the exit of the driven pulley 21, the top portions of the front main surface 50f and rear main surface 50r of the metal elements 42, 42 that are adjacent to each other in the longitudinal direction of the metal ring 41 come into contact with each other at the contact point P1, and the outermost peripheral surface of the metal ring 41 comes into contact with the ear-part bottom surface 55 at the contact point P2, only whereby it is possible to ensure a gap between the saddle surfaces 54 of the metal element 42 and the innermost peripheral surface of the metal ring 41, and it is possible to ensure a gap between the protrusion 53f and the concavity 53r of the metal elements 42, 42.

Next, operation of the present invention according to the aforementioned exemplary embodiment will be described. The clearance d between the outermost peripheral surface of the metal ring 41 and the ear-part bottom surfaces 55 is set at a value that avoids, at the exit of the driven pulley 21, the innermost peripheral surface of the metal ring 41 from contacting the saddle surfaces 54, and avoids mutual contact between the protrusion 53f and the concavity 53r of neighboring metal elements 42, 42.

According to setting of the clearance d accordingly, it is unnecessary that at the exit of the driven pulley 21, a play for the inclination of the metal element 42 be set between the protrusion 53f and the concavity 53r of the neighboring metal elements 42, 42, and the metal elements 42 only incline, with the engaging portion of the protrusion 53f and the concavity 53r serving as the center, and do not move laterally. Therefore, when entering the drive pulley 16, the protrusion 53f of a succeeding metal element 42 engages the concavity 53r of a preceding metal element 42 that has entered the drive pulley 16 first, and the succeeding metal element 42 smoothly enters the drive pulley 16 while avoiding contact with the drive pulley 16. Thus, it is possible to improve the durability of the entire metal V-belt 25 without having to increase the strength of the protrusion 53f and concavity 53r of the metal elements 42, 42.

Figure 12:
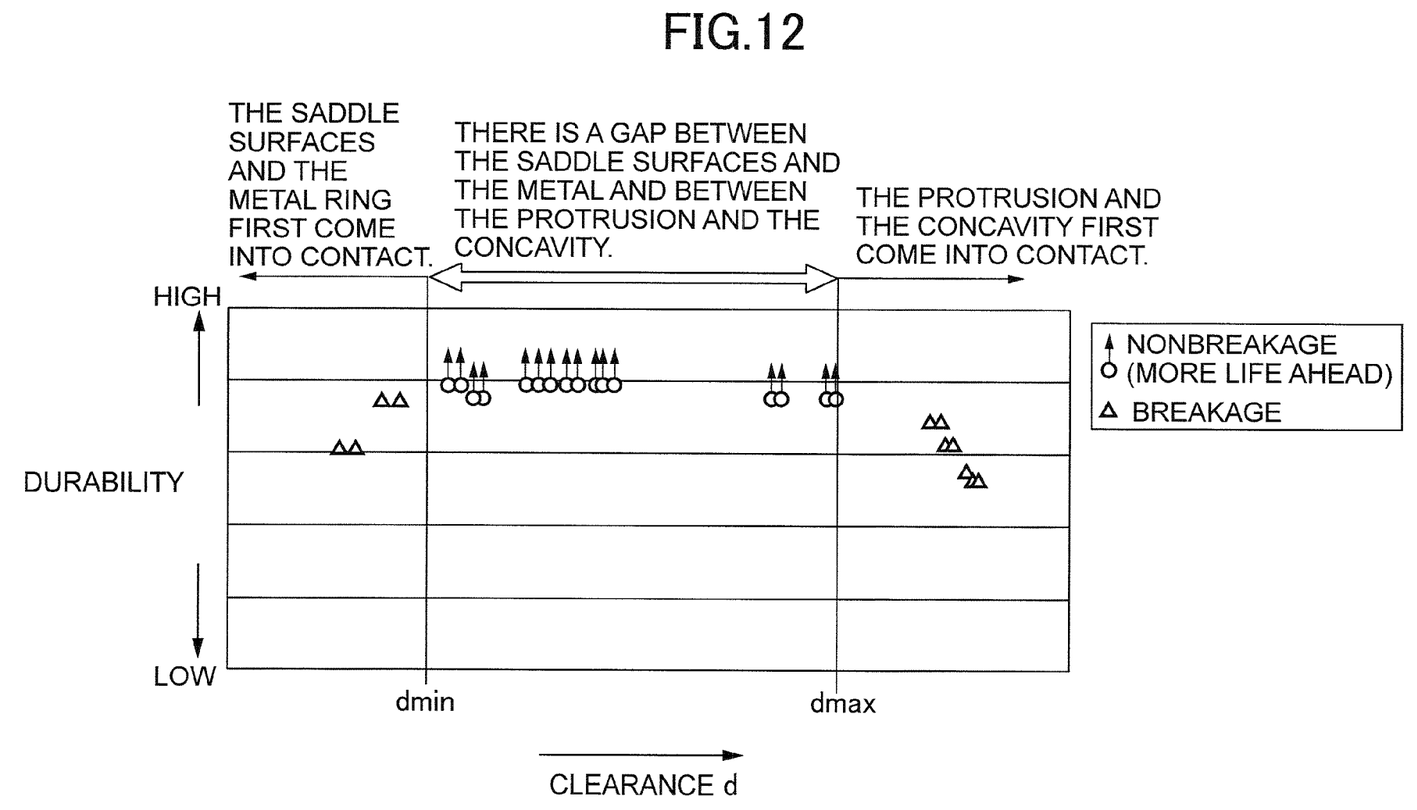
FIG. 12 is a diagram that compares durability observed when the clearance between the outermost periphery and the bottom surface of the ear part of the metal ring is changed.

The durability of the metal V-belt 25 is compared for cases where the clearance d is increased and decreased. As shown in FIG. 12, compared to the durability that is observed when the clearance d is set at a value not more than the clearance dmin occurring when the gap between the saddle surfaces 54 of the metal element 42 and the innermost peripheral surface of the metal ring 41 is "0" at the exit of the driven pulley 21, that is, the innermost peripheral surface of the metal ring 41 first comes into contact with the saddle surfaces 54, and compared to the durability that is observed when the clearance d is set at a value not less than the clearance dmax occurring when the gap between the protrusion 53f and the concavity 53r is "0" at the exit of the driven pulley 21, that is, when the protrusion 53f first comes into contact with the concavity 53r, it is possible to increase the durability that is observed when the clearance d is set at a value that avoids, at the exit of the driven pulley 21, the contact of the innermost peripheral surface of the metal ring 41 with the saddle surfaces 54, and avoids mutual contact of the protrusion 53f and the concavity 53r, that is, a value that is larger than dmin and smaller than dmax.

Incidentally, in FIG. 12, the mark Δ indicates a condition in which breakage occurred, whereas the mark ○, which is obtained when the clearance d, is set at a value larger than dmin and smaller than dmax, indicates a condition in which breakage has not occurred and additional service life results.

In the test conducted to obtain the results shown in FIG. 12, on the side where the clearance d is small, as well as on the side where the clearance d is large, the phenomenon that the protrusion 53f and the metal ring 41 are broken, and the phenomenon that the wear of the metal element 42 increases, occur in metal elements 42 in which the average value of the minimum distance between the saddle surface 54 and the ear-part bottom surface 55 is not less than ±3σ (standard deviation). Therefore, dmin and dmax can respectively be defined.

Here, dmin is defined as {(minimum distance between saddle surface 54 and ear-part bottom surface 55)−3σ−(layer thickness of metal ring 41)}, and dmax is defined as {(minimum distance between saddle surface 54 and ear-part bottom surface 55)+3σ−(layer thickness of metal ring 41)}.

It follows that when the rejection region of normal probability is 0.00135, and the number of metal elements 41 used in the test is 420, one metal element 41 falls under the category. In actuality, in a metal element 42 of d≦dmin, the breakage of the protrusion 53f and the metal ring 41 occurred and in a metal element 42 of dmax≦d, the wear of the metal element 42 increased. Therefore, the above information support the surprisingly good results that are unexpectedly obtained in a metal element 42 for which dmin<d<dmax is set, that is, neither the breakage of the protrusion 53f and the metal ring 41, nor an increase in the wear of the metal element 42, occurs.

Although an embodiment of the present invention was described above, it is possible to perform various design changes so long as they do not depart from the gist of the invention.

For example, while the protrusion 53f is provided in a protruding manner on the front main surface 50f and the concavity 53r is provided in a depressed manner in the rear main surface 50r, the locations of the protrusion 53f and concavity 53r can be reversed.

What is claimed is:

1. A metal V-belt comprising:
   a metal ring having an endless belt shape;
   a plurality of metal elements supported by the metal ring in a longitudinal direction of the metal ring, the metal V-belt being wound on a drive pulley and a driven pulley to transmit power between the drive pulley and the driven pulley,
   wherein the plurality of metal elements includes a first metal element and a second metal element adjacent the first metal element, and wherein the first metal element comprises:
   a front main surface defined on a first side and a rear main surface defined on an opposing second side;
   a pair of right and left slots configured to receive the metal ring therein, the slots being defined between a saddle surface and an ear-part bottom surface, which connect the front and rear main surfaces;
   a protrusion provided in a protruding manner on one of the front main surface and the rear main surface; and
   a concavity that is defined in the other of the front main surface and the rear main surface, the concavity being configured to engage a protrusion provided in a protruding manner on one of a front main surface and a rear main surface of the second metal element; and
   a clearance defined between an outermost peripheral surface of the metal ring and the ear-part bottom surface has a value,
   wherein at an exit of the driven pulley, top portions of the front and rear main surfaces of the first and second metal elements that are adjacent to each other in the longitudinal direction of the metal ring contact each other, and the outermost peripheral surface of the metal ring contacts the ear-part bottom surface, and
   wherein the innermost peripheral surface of the metal ring and the saddle surface are free from contacting each other, and a portion of the protrusion of the second metal element which extends orthogonally relative to the longitudinal direction of the metal ring and a portion of the concavity of the first metal element which directly opposes the portion of the protrusion of the second metal element are free from contacting each other.

2. The metal V-belt according to claim 1, wherein the clearance is defined by a relationship dmin <d<dmax, and wherein a standard deviation is denoted by σ, and dmin and dmax are respectively defined as:

$d$min={(a minimum distance between the saddle surface and the ear-part bottom surface)−3σ−(a layer thickness of the metal ring)}, and $d$max ={(the minimum distance between the saddle surface and the ear-part bottom surface)+3σ−(the layer thickness of metal ring)}.

* * * * *